(12) United States Patent
Jones

(10) Patent No.: US 7,157,818 B2
(45) Date of Patent: Jan. 2, 2007

(54) LOW NOISE VENTILATION SYSTEM FOR ELECTRIC MOTOR

(75) Inventor: Patrick M. Jones, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 48 days.

(21) Appl. No.: 10/715,172

(22) Filed: Nov. 17, 2003

(65) Prior Publication Data

US 2005/0104459 A1    May 19, 2005

(51) Int. Cl.
*H02K 9/06* (2006.01)

(52) U.S. Cl. .................. 310/63; 310/60 R; 417/423.14

(58) Field of Classification Search ............. 310/60 R, 310/62, 63
See application file for complete search history.

(56) References Cited

U.S. PATENT DOCUMENTS

| | | | | |
|---|---|---|---|---|
| 3,749,953 A | * | 7/1973 | Baumann et al. ............. | 310/62 |
| 4,074,156 A | * | 2/1978 | Widstrand et al. ............ | 310/62 |
| 4,115,030 A | | 9/1978 | Inagaki et al. | |
| 4,336,473 A | * | 6/1982 | Wetters et al. ............... | 310/88 |
| 5,311,089 A | * | 5/1994 | Stroetgen et al. ............ | 310/50 |
| 5,563,461 A | | 10/1996 | Daniels | |
| 5,714,819 A | | 2/1998 | Gilliland et al. | |
| 5,780,946 A | * | 7/1998 | Nakamura et al. ........... | 310/58 |
| 6,059,541 A | | 5/2000 | Beckey et al. | |
| 6,411,000 B1 | | 6/2002 | Rew | |
| 6,435,828 B1 | | 8/2002 | Bostwick | |
| 6,514,052 B1 | | 2/2003 | Bostwick | |
| 6,570,284 B1 | * | 5/2003 | Agnes et al. ................. | 310/89 |
| 6,700,235 B1 | * | 3/2004 | McAfee ........................ | 310/52 |
| 6,894,409 B1 | * | 5/2005 | Bostwick et al. ............. | 310/58 |
| 2003/0090163 A1 | | 5/2003 | Bostwick et al. | |

FOREIGN PATENT DOCUMENTS

| | | | |
|---|---|---|---|
| DE | 29 10 845 A1 | | 10/1980 |
| DE | 31 47 501 A1 | | 6/1983 |
| DE | 3344197 | * | 6/1985 |
| EP | 0261295 | * | 8/1986 |
| GB | 2319669 | * | 5/1998 |
| JP | 2001 057759 | * | 2/2001 |

* cited by examiner

*Primary Examiner*—Burton Mullins
(74) *Attorney, Agent, or Firm*—Harness, Dickey & Pierce P.L.C.

(57) ABSTRACT

An electric motor having a fan and baffle for directing a flow of cooling air through the motor while minimizing generation of noise. The fan has blades which are curved in a direction opposite to the direction of rotation of the fan. The blades are spaced from a hub of the fan thereby forming a clearance region to inhibit air flow shear and turbulence. The baffle has an annular shape with upstream and downstream faces for directing air flow. The downstream face is inclined so that air flowing along its surface has a component of motion in the downstream direction to inhibit separation of flow from the surface. The baffle is received in a casing of the motor with a slip fit.

20 Claims, 6 Drawing Sheets

LOW NOISE VENTILATION SYSTEM FOR ELECTRIC MOTOR

BACKGROUND OF THE INVENTION

This invention relates generally to cooling of dynamo-electric machines, and in particular to a fan and baffle for directing a flow of cooling air through an electric motor which ventilates the motor while minimizing the generation of noise.

A substantial concern in the use of electric motors in many appliances is the generation of noise. Motor-induced noise emanating from pumps, blowers, dishwashers, or clothes washers and dryers can be, at best, an annoyance which must be tolerated or, at worst, a major obstacle to the marketability of the appliance. Consumers and appliance manufacturers generally favor motors which are more quiet. Studies for locating the sources of noise generation in motors have found that ventilation systems are a major contributor. Ventilation is necessary because electric motors generate heat during operation which may be detrimental. Component parts such as windings and control boards may be damaged or degraded by high temperatures. Consequently, motors are typically cooled by air moving through and around the motors which transports heat energy away from hot parts.

An internal ventilation system of a motor frequently includes a fan and a baffle for directing the flow of cooling air through the housing or casing shell of the motor. In one particular system, the fan is mounted on the shaft of the rotor at one axial end of the motor and draws air from the axially opposite end of the motor on rotation of the fan. The air travels through the motor to cool the motor and is then pushed outward away from the shell by the fan. Frequently, the fan is a radial flow type fan and has a plurality of straight blades which discharge air radially outwardly. The fan blades extend radially outward from a central hub. The blades are typically flat, rectangular members oriented in planes parallel to the axis of rotation of the fan so that they will push air by centrifugal force. Air moving into a central portion of the fan is pushed outwardly toward a plurality of exit vents provided in the shell.

The baffle is typically a flat, ring-shaped disk that is positioned between the stator and the fan to provide for efficient cooling. It forms a barrier to flow of cooling air along an outer periphery of the interior of the shell, such that the air is directed radially inwardly, generally across stator windings, to a central opening in the baffle. The air then reaches the central portion of the fan and is pushed radially outwardly for delivery out away from the motor.

Unfortunately, the flow path of cooling air has resulted in local regions of turbulence, backflow, and flow separations which elevate noise levels. The baffle is flat, with both of its faces oriented radially, and it forces the flow to make generally sharp turns which generates eddy currents. Although flow downstream of the baffle must move in a direction not only radially outward but also with a downstream, axial component to reach the exit vents, the baffle on its downstream face has no contouring in the axial direction. Thus the flow tends to separate from the downstream face of the baffle. The baffle results in flow being exposed to right angle corner turns, which have a tendency to cause flow separation and an undesirable pressure loss resulting in lower air flow rates and velocity. Further, the fan blades are configured to shear the air, which creates noise. As the fan rotates, each blade moves transverse to the axial motion of air being received into the fan. The shearing action also creates a pocket of low pressure around the hub and turbulence which can produce additional noise.

Baffles of the prior art have additional drawbacks. Typically, the baffle is sized for an interference fit in the motor shell. The baffle is installed by pressing the baffle into the shell with the outer perimeter in tight engagement with the internal wall of the shell. However, when the size dimension of the baffle or shell are inadvertently varied due to manufacturing tolerances, the baffle can be installed in a loose or misaligned condition, or can be damaged when press fit into the shell. Moreover, baffles of the prior art frequently have water flow notches in the outer perimeter which degrade cooling efficiency. The notches prevent accumulation of water in the motor shell when it ingests water, such as when exposed to heavy rain, to avoid contact with electrical components. One of the notches positioned on the lower side functions as a passage for allowing water to flow through the shell to the exit vents. Unfortunately, the notches also permit passage of cooling air which can therefore bypass the windings and fan, leading to air recirculation and loss of efficiency.

SUMMARY OF THE INVENTION

Among the several objects and features of the present invention may be noted the provision of a ventilation system for an electric motor which reduces the generation of noise; the provision of such a ventilation system which efficiently cools the motor; the provision of such a ventilation system having a baffle and fan which are contoured to reduce flow separations and turbulence; and the provision of such a ventilation system having a baffle which may be readily secured in the motor.

In general, an airflow directing baffle of the present invention is for insertion into a casing of an air-cooled electric motor to direct a flow of cooling air. The baffle comprises a body having an annular section surrounding a central opening for passage of the flow of cooling air. The central opening defines a plane generally transverse to a longitudinal axis of the body. The annular section has an upstream face for directing air toward the central opening and a downstream face for directing air away from the opening. The downstream face of the annular section is inclined in a radially outward and downstream direction at an angle relative to the plane of the central opening so that air which flows adjacent the downstream face has a component of motion in the downstream direction.

In another aspect, an electric motor according to the present invention has a ventilation system which inhibits generation of noise. The motor comprises a housing defined by a hollow casing, a stator secured in the housing, a rotor and a rotor shaft mounting the rotor for rotation in the housing about an axis. A fan mounted on the rotor shaft is for rotation to advance a flow of cooling air through the housing to cool the motor, the fan having a central hub and a plurality of blades. A baffle is secured in the housing at a position generally between the stator and the fan for directing the flow. The baffle has an annular shape and a central opening for passage of cooling air toward the fan. The blades of the fan are spaced from the hub thereby forming a clearance region between the hub and the blades.

In yet a further aspect, an electric motor of the present invention comprises a housing defined by a hollow casing, a stator secured in the housing, a rotor and a rotor shaft mounting the rotor for rotation in the housing about an axis. A fan mounted on the rotor shaft is for rotation to advance a flow of cooling air through the housing to cool the motor.

The fan has a central hub and a plurality of blades. A baffle is secured in the housing at a position generally between the stator and the fan for directing the flow. The baffle has an annular shape and defines a central opening for passage of cooling air toward the fan. The baffle is sized for being received in the casing with a slip fit.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENTS

Figure 1:
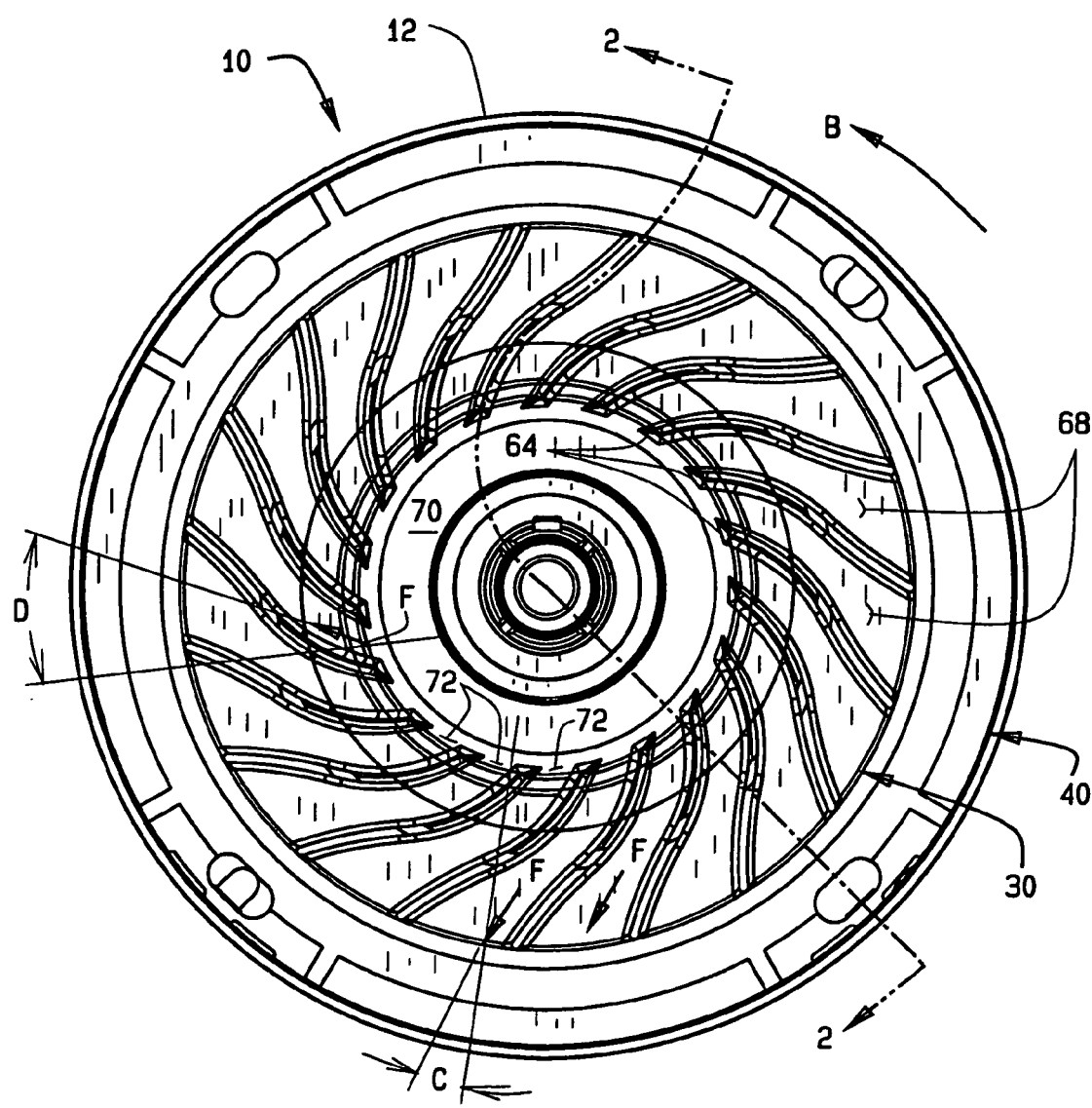
FIG. 1 is a schematic end elevation of a motor having a ventilation system according to the present invention.
Figure 2:
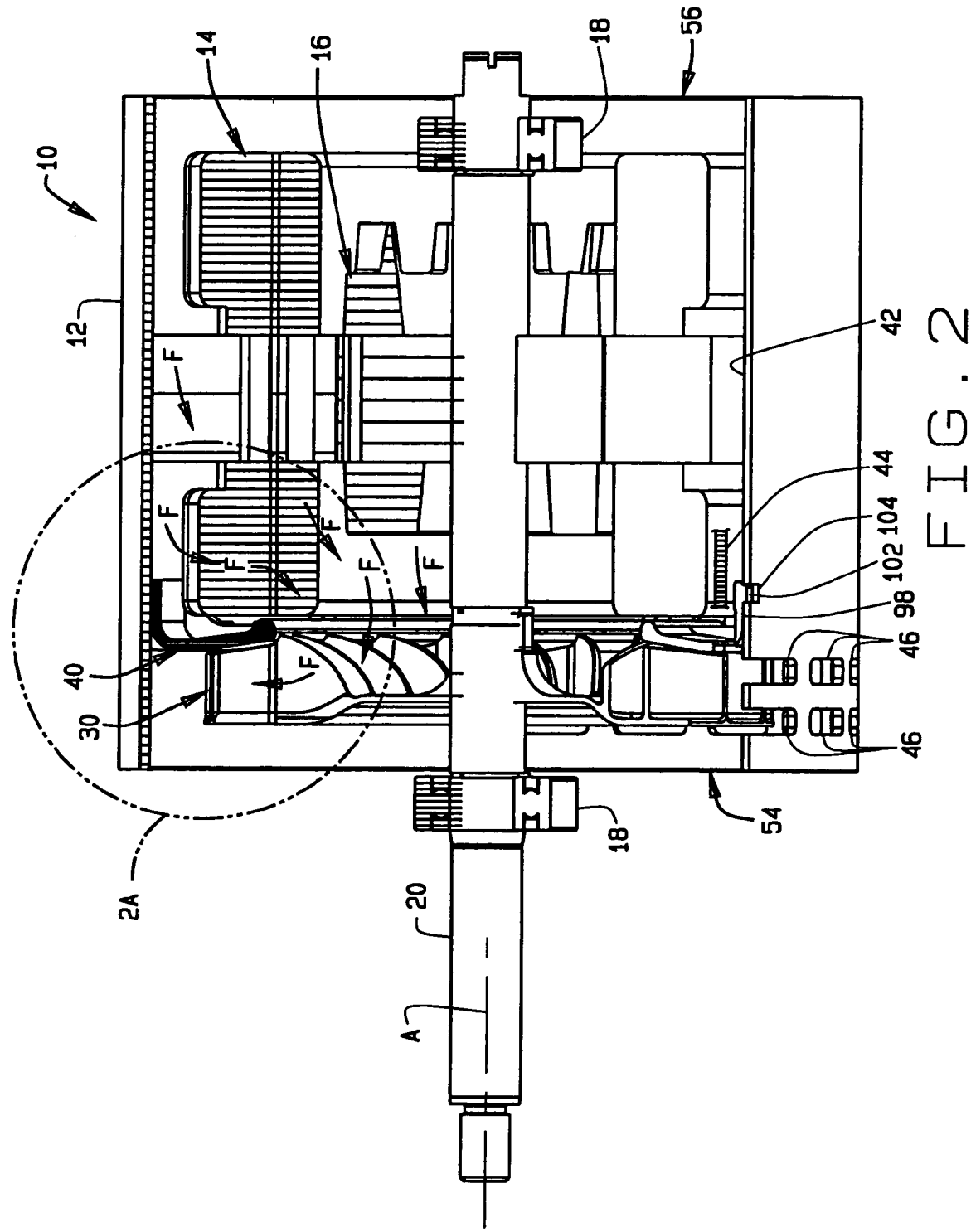
FIG. 2 is a schematic section of the motor taken on line 2—2 of FIG. 1.

Referring now to the drawings and in particular to FIGS. 1 and 2, an electric motor having a ventilation system according to the present invention is designated in its entirety by the reference numeral 10. The motor 10 includes a casing 12 having a hollow interior. A stationary assembly or stator (generally designated 14) and a rotatable assembly or rotor (generally designated 16) magnetically coupled to the stator are both positioned within the interior of the motor casing 12. As is known in the art, the stator 14 is generally annular and holds one or more wire-wound coils, or windings. When energized with electrical current, the windings interact with the rotor 16 to produce torque. Bearings 18 mounted on each end of the motor casing receive the rotor 16, so the rotor is free to rotate about a central longitudinal axis A which is coaxial with the stator 14. The rotor includes an elongate shaft 20 which extends through the casing 12 for transmitting power to a device attached to the shaft. (The driven device is not shown in the drawings.) Most aspects of the stator and rotor described above are conventional and will not be described in further detail. Although the description herein is with reference to an electric motor, it is understood the other dynamoelectric machines, such as generators, do not depart from the scope of this invention.

The ventilation system for cooling the motor includes a fan (generally designated 30) and a baffle (generally designated 40) for directing a flow of air through the casing 12 to cool component parts. The flow of cooling air in FIG. 2 is generally from right to left and is shown by the arrows designated F. The casing 12, also referred to by those skilled in the art as a shell or housing, is generally cylindric with a smooth surface along 42 the interior. A pair of end shields (not shown) are mounted to the axially opposite ends of the casing 12 for covering the ends. Conventional through-bolts 44 (a fragment of one bolt 44 being shown in FIG. 2) extend between opposite end shields of the motor 10. The upstream end shield has a plurality of conventional vent openings (not shown) comprising entrances for receiving cooling air into the casing. A plurality of exit vent openings 46 (FIG. 2) extend through the side of the casing 12 for delivering cooling air out from the casing. The exit openings 46 are located on a circumferential portion of the motor 10 which is expected in normal operation to be the horizontally lower or bottom half of the casing. In this way, rain and other moisture is inhibited from entering the casing 12 and moisture which is inside the casing may drain out through the openings 46.

Figure 3:
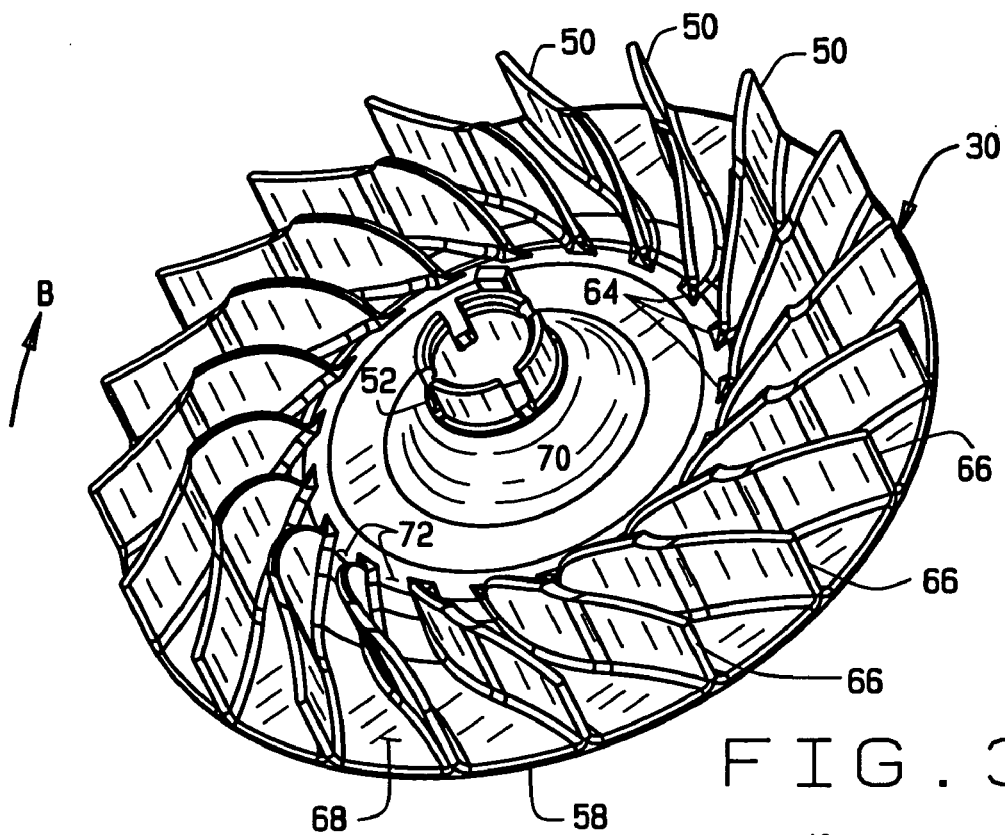
FIG. 3 is a perspective of a fan of the ventilation system.

The fan 30 advances the flow of cooling air through the casing 12 to cool the motor. The fan is a radial flow type fan and has a plurality of blades 50, with a diameter of the fan being dimensioned so that the fan may be received in the interior of the casing 12. A center hub 52 (FIG. 3) is mounted on the rotor shaft 20 at one axial end of the motor so that the fan draws air from the axially opposite end of the motor on rotation. In the embodiment shown in the drawings, the fan 30 is mounted generally at a downstream end 54 of the motor and draws air from an upstream end 56. However, it is understood that the fan may be mounted generally at the upstream end 56 and draw air through the casing 12 from the axially opposite end 54, or the fan may be designed to push air through the casing, without departing from the scope of the invention. The hub 52 is secured to the shaft 20 against rotation relative to the shaft by any suitable method, such as keying or clamping. In one embodiment, air travels from the upstream end through the casing in a generally axial direction to cool the motor and is then pushed radially outwardly by the fan 30, generally toward the exit openings 46, as indicated by the arrows F in FIG. 2. The fan has a disc shaped backing wall 58 (FIG. 3) that rotates with the blades 50 and blocks entry of air into the fan from the downstream end of the motor. In this way the backing wall 58 increases the amount of air drawn into the casing 12 from the upstream end of the motor. In the embodiment shown in the drawings, the fan 30 is of one-piece construction and is formed of a suitable rigid material, such as a moldable and lightweight nylon plastic. It is understood that the fan 30 can have any number of blades, be constructed of multiple component parts, or be formed of other materials without departing from the scope of this invention.

Figure 8:
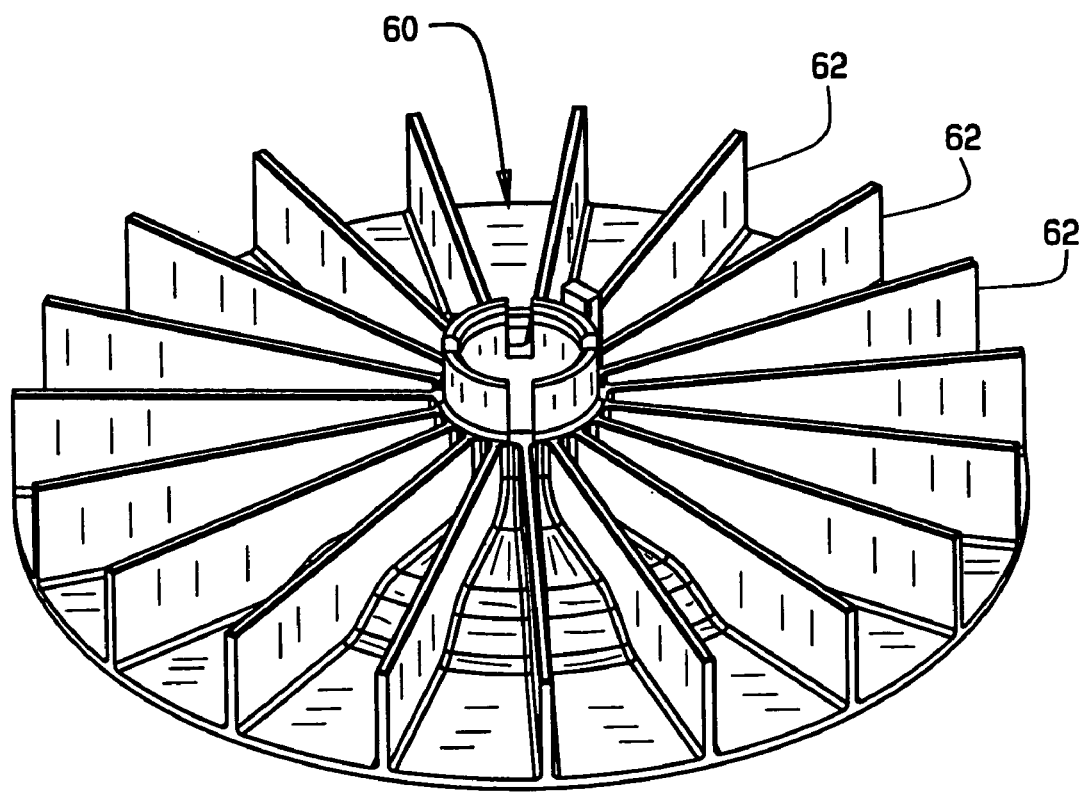
FIG. 8 is a perspective of a fan of the prior art.

Significantly, the blades 50 are inclined (or curved) in a plane perpendicular to the axis A of rotation, unlike a straight blade radial fan 60 of the prior art which is shown in FIG. 8. The blades 62 of the prior art extend outward from a central hub in a uniformly radial direction. The blades 62 are flat, rectangular members oriented in planes parallel to the axis of rotation of the fan so that they will push air by centrifugal force. The fan 60 of FIG. 8 is a "bi-directional" fan in that it operates with equal effectiveness in either direction of rotation and is adapted to cool dynamoelectric devices having shafts which rotate in opposite directions during various phases of operation. However, for those devices whose shafts seldom or never rotate in opposite directions (such as motor 10), the fan may be "unidirectional" with blades optimized for performance in only one direction of rotation.

The fan 30 of the present invention (FIG. 3) has blades 50 which curve in a direction opposite that of the rotation, known to those skilled in the art as a backward curved radial fan. The blades 50 curve backward in the sense that each blade is inclined from a radially inner or leading edge 64 toward a radially outer or trailing edge 66 in a direction opposite the fan's motion as it rotates. As shown in FIG. 1 (which is a view from the downstream end 54 with the backing wall 58 removed), a direction of rotation of the fan is indicated by arrow B and the blades 50 curve toward the opposite direction. Curvature facilitates exhausting air using both centrifugal force and force caused by the blade 50 pushing the air. It also provides additional blade area relative to straight blades for accelerating the flow of air. The curvature gives a swirl to the flow which tends to avoid shear and turbulence in the flow as it moves into and through the fan 30. Each blade 50 is smoothly contoured moving along the blade from the radially inner edge 64 to the radially outer edge 66. A passage 68 is defined between each pair of adjacent blades 50, and the flow exits from each passage at an angle C (FIG. 1) relative to the radial direction. In one embodiment, the angle C is between about 5 and 45 degrees, and in the embodiment shown in the drawings, angle C is about 30 degrees. It is understood that blades of other configurations and angles, such as straight blades which are inclined relative to the radial direction, or blades with two or more segments of varying inclination (curved or straight or a combination of both) with discontinuities at junctures between segments, do not depart from the scope of this invention.

Significantly, the radially inner (leading) edges 64 of the blades are spaced from the hub 52 to form a clearance region, generally indicated 70, located in the central portion of the fan 30 (i.e., positioned between the hub and the radially inner edges of the blades) to minimize generation of noise. The provision of the clearance region 70 tends to avoid shearing of air and backflow which occurs at the central portion of conventional fans 60 of the prior art. Air approaching the fan 30 in the clearance region 70 can begin to move naturally toward a lower pressure region and begin to turn into a swirl pattern approaching the blades. The air gradually begins to turn and twist in the clearance region 70 with minimal shear and the associated pressure loss and turbulence. Each passage 68 has an inlet 72 for receiving air from the clearance region into the passage. The inlet 72 is shaped to minimize turbulence, with a curvature defining an initial flow angle D (FIG. 1) relative to the radial direction. In one embodiment, the angle D is between about 20 and 80 degrees, and in the embodiment shown in the drawings, angle D is about 33 degrees. The shape of the inlet 72 inhibits flow separation and eddy formation, and promotes smooth flow. Each passage 68 has an area distribution along the passage to provide uniform acceleration of flow as cooling air moves radially outwardly.

Figure 4:
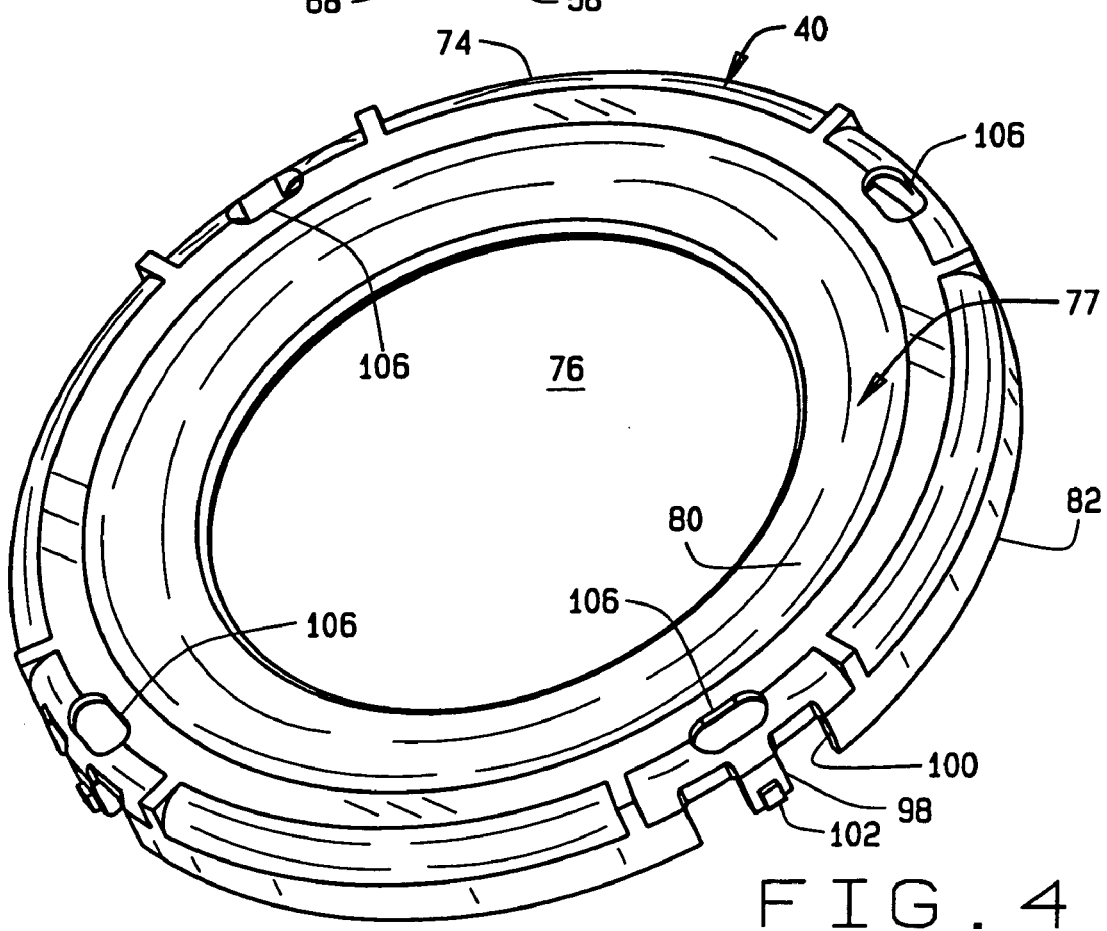
FIG. 4 is a perspective of a baffle of the ventilation system.
Figure 5:
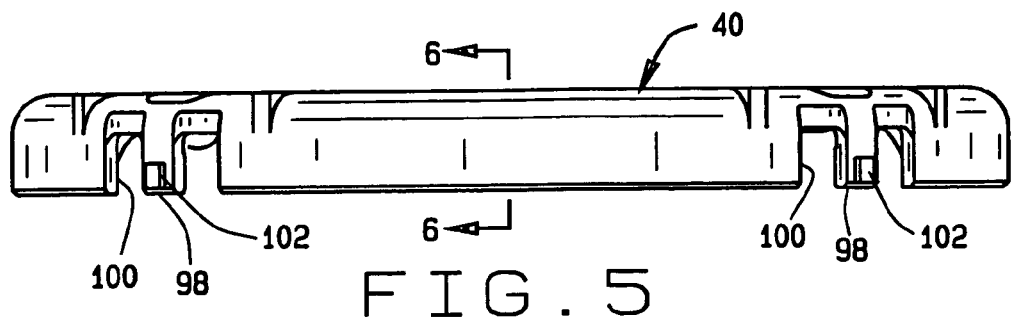
FIG. 5 is side view of the baffle of FIG. 4.
Figure 6:
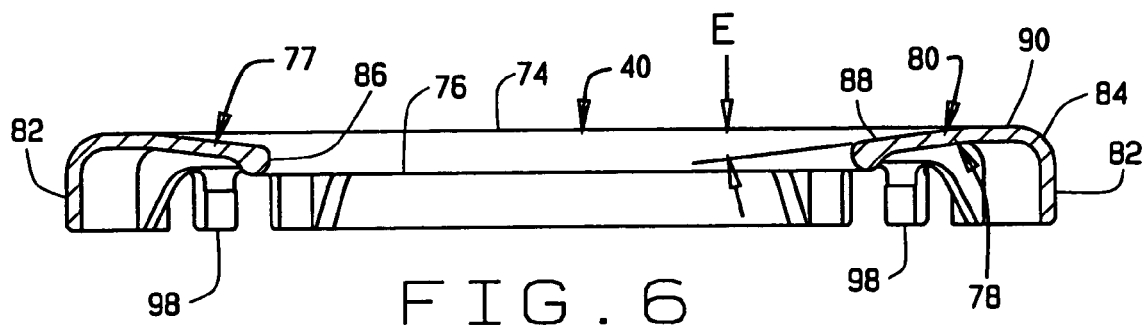
FIG. 6 is a section taken on line 6—6 of FIG. 5.

In the embodiment shown in FIGS. 4–6, the baffle 40 includes a generally flat, ring-shaped body 74 that is positioned between the stator 14 and the fan 30 to provide for efficient cooling. It forms a barrier to flow of cooling air along an outer periphery of the interior of the casing 12, such that the air is directed radially inwardly toward a central opening 76 in the baffle as it moves toward the fan. The baffle 40 is configured to direct air across electrical windings of the stator 14, in particular across the winding end turns, and to increase the velocity of the air flow in order to provide efficient convective cooling of the stator windings. The central opening 76 in the baffle defines a plane generally transverse to the longitudinal axis A.

In the illustrated embodiment (FIGS. 4–6), the body 74 comprises an annular section 77 having an upstream face 78 on an upstream side of the body and a downstream face 80 on a downstream side of the body. A rim 82 extends from the periphery of the annular section 77 for engagement with an interior surface 42 of the casing. In this particular embodiment, the rim 82 extends in an upstream direction from the annular section 77. The annular section and rim are preferably integrally joined by a rounded juncture 84 which may be referred to as an outer circumferential edge of the annular section. The annular section 77 has an inner edge defined, in this embodiment, by a lip 86 surrounding the central opening 76. In one embodiment, the lip 86 has a curved convex surface and projects in a generally upstream longitudinal direction from the upstream face 78 of the annular section of the baffle. The lip 86 reduces separation of the air flow from the baffle 40 as the flow passes around the lip in moving from the upstream side to the downstream side of the lip, thereby avoiding pressure losses and eddy formation. In addition, the lip projection reduces the cross sectional area of the air flow passage between the lip 86 and the stator end turns, thereby constricting the flow and increasing a velocity of the air flow at that location to increase cooling efficiency. A similar lip and system are shown in co-pending U.S. patent application Ser. No. 09/993,071, filed Nov. 13, 2001 and entitled "Dynamoelectric Device Air Flow Baffle Shaped to Increase Heat Transfer," which is hereby incorporated by reference.

The center opening 76 is dimensioned larger than the rotor shaft 20 of the motor to provide ample clearance for the flow of air from the stator and rotor on one side of the baffle 40 to the fan on the opposite side of the baffle. In the embodiment shown in the drawings, the baffle 40 is of one-piece construction and is formed of a suitable material, such as a moldable polyester or nylon plastic. It is understood that the baffle can have multiple component parts and be formed of other materials without departing from the scope of this invention.

As shown in FIG. 6, the downstream face 80 of the annular section of the baffle is inclined at an angle E relative to the plane of the opening 76 so that air which flows adjacent the downstream face has a component of motion in the downstream direction. In one embodiment, angle E is within a range of about 5 to 20 degrees. The angle E is about 7 degrees in the embodiment shown in the drawings. The angle is limited by length constraints of the motor. The exit vent openings 46 are positioned downstream from the baffle 40, so the flow exiting the fan is thereby directed generally toward the openings. This arrangement reduces the need for other directional changes of the flow in the casing 12, which can produce turbulence and reduce pressure.

It will be understood that the annular section 77 of the baffle need not be inclined along its entire surface. For example, in the particular embodiment shown in FIGS. 2A and 6, the downstream face 80 of the annular section has a conical region 88 which is inclined at the aforementioned angle E and which extends radially outward from the lip 86, and a flat annular region 90 extending radially outward from the conical region to the juncture with the rim 82 in a plane generally parallel to and spaced downstream from the plane of the central opening 76. In this embodiment, the outer edge of the annular section 77 (i.e., the juncture of this annular region 90 and the rim) is spaced longitudinally downstream from the inner edge of the section. However, other configurations may be used without departing from the scope of this invention.

Figure 7:
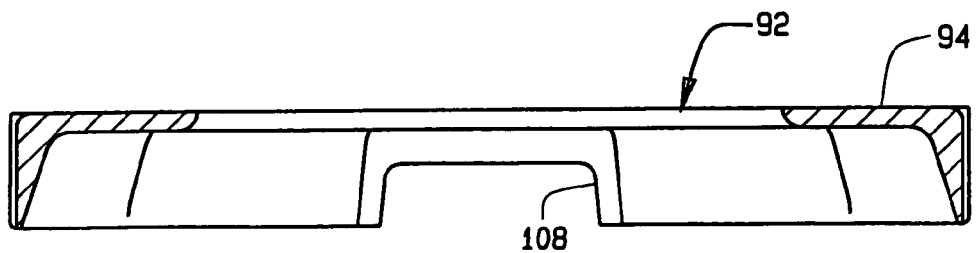
FIG. 7 is a section similar to FIG. 6 showing a baffle of the prior art.

The baffle 40 has a smooth contour with no sharp corners which could facilitate flow separations and eddies. By contrast, a baffle 92 of the prior art, shown in FIG. 7, has generally sharper corners and flat surfaces. The downstream side (face) 94 is not inclined in the downstream direction, such that after flow adjacent the baffle passes through the center opening of the baffle, it more readily separates from the downstream face 94. Further, it is not directed downstream toward the exit openings 46 so that additional flow turning in the casing is required.

Figure 2A:
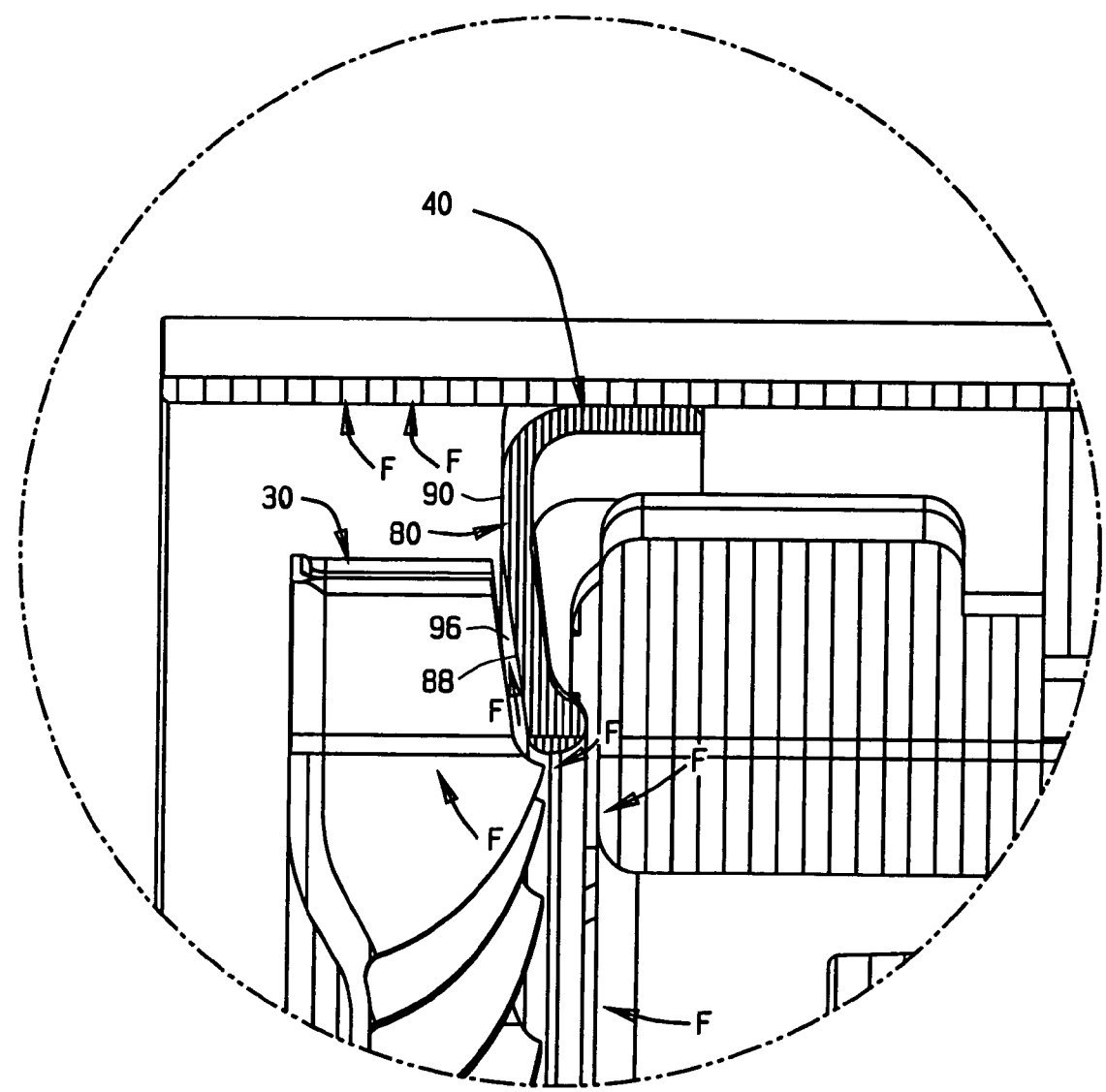
FIG. 2A is an enlarged portion of the view of FIG. 2.

The baffle 40 and fan 30 of this invention are shaped and positioned to provide a uniform spacing therebetween which promotes smooth air flow as the fan rotates. As shown in FIG. 2A, the downstream face 80 of the baffle is spaced from the fan blades 50 with a gap 96 which is generally uniform in size along the gap. The fan blades 50 are shaped to correspond with the contour of the downstream face 80 of the annular section of the baffle. In one embodiment, the gap 96 is within a range of from about 1/16 to 3/16 inch. The small and uniform gap 96 inhibits formation of local pockets of turbulence as the fan 30 rotates adjacent to air moving along the downstream face 80 of the baffle.

The baffle 40 is configured to be readily secured in the casing 12 with a slip fit. The outer rim 82 of the baffle has a diameter smaller than a corresponding internal diameter of the casing 12, unlike baffles of the prior art which are sized for an interference fit. In one embodiment, the outer diameter of the rim 82 is sized in a range of about 0.002 to 0.030 inch less than the inner diameter of the casing 12 (nominal 6.3 inch diameter). In the embodiment shown in the drawings, the diameter is about 0.005 inch less than the inner diameter of the casing. Thus, the baffle 40 can be installed in the casing without excessive force, damage, or misalignment which typically occurs with interference fits.

The baffle 40 has tabs 98 for releasably securing the baffle in the casing 12. As shown in FIGS. 4 and 5, the tabs 98 are circumferentially spaced on the baffle. Each tab is cantilevered in a notch 100 in the rim 82 and extends generally in the same direction as the rim. A tip of each tab 98 has a locking formation 102 for snap-lock engagement in a corresponding hole 104 in the casing (one such hole 104 is shown in FIG. 2). In the embodiment shown in the drawings, the locking formation 102 is a rectangular protrusion. When the baffle is installed into the interior of the casing, one or more of the tabs 98 align with corresponding holes 104 in the casing such that the locking formation 102 snaps into a respective hole due to cantilever motion of the tab. The baffle 40 can be removed by pushing the locking formations 102 out from the holes 104. It is understood that the arrangement for securing the baffle to the casing may vary without departing from the scope of the invention.

In one embodiment, precautions are taken to guard against inadvertent removal of the locking formations 102 from respective holes 104 in the casing 12. As shown in FIG. 4, each tab 98 is positioned adjacent one hole 106 of a set of four holes 106 which are circumferentially spaced on the body 74. These holes 106 are for receiving the through-bolts 44 (a portion of a bolt 44 being shown in FIG. 2) which extend between opposite end shields of the motor. Although the primary function of the bolts 44 is to hold the end shields in position, they also function as stops preventing free motion of the cantilevered tabs 98 so that the locking formations 102 cannot be removed from the holes 104. As a result, the bolts 44 must be removed before the baffle 40 can be disassembled from the casing 12.

The rim 82 of the baffle has no notches for flow of water. In contrast, the baffle 92 of the prior art (FIG. 7) has a rim formed with notches 108, one of which must be positioned on a lower side of the interior of the casing 12 and functions as a passage for water. In use, the ventilation system of the present invention operates without the need for notches to prevent accumulation of water, and thereby avoids the associated degradation in cooling efficiency. The shapes of the baffle 40 and fan 30 provide aerodynamic flow paths, velocities, and pressure variations across the baffle such that water is not so readily drawn into the entrance vent openings as in motors of the prior art. The vacuum pressure is less so that less water is ingested. Further, water which is ingested is more effectively drained out through drain hole(s) in the casing.

In view of the above, it will be seen that the several objects of the invention are achieved and other advantageous results obtained. The ventilation system provides smooth air flow circulation, inhibiting formation of vortices and flow separations. In practice, the system has achieved significant reductions in sound levels.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. An electric motor having a ventilation system which inhibits generation of noise, the motor comprising:
   a housing defined by a hollow casing;
   a stator secured in the housing;
   a rotor and a rotor shaft mounting the rotor for rotation in the housing about an axis;
   a fan mounted on said rotor shaft for rotation to advance a flow of cooling air through the housing to cool the motor, the fan having a plurality of blades; and
   a baffle secured in the housing at a position generally between the stator and the fan, the baffle including an annular section, the annular section including an inner edge defined by a lip, the lip having a curved convex surface.

2. An electric motor as set forth in claim 1 wherein the fan has an intended direction of rotation about said axis and wherein the blades of the fan are inclined in a direction opposite said direction of rotation.

3. An electric motor as set forth in claim 2 wherein the baffle has an upstream side facing toward the stator and an opposite downstream side facing toward the fan, and wherein the baffle is positioned such that the downstream side is spaced from the fan blades with a gap which is generally uniform in size along the gap.

4. An electric motor as set forth in claim 3 wherein said gap is within a range of from about 1/16 inch to 3/16 inch.

5. An electric motor as set forth in claim 3 further comprising a rim on the baffle which is positioned generally at an outer periphery of the baffle, the rim having at least one tab configured for being received in a corresponding hole in the casing to releasably secure the baffle in the casing.

6. An electric motor as set forth in claim 1 wherein said annular section of the baffle extends radially inward from the housing and forms an axial gap between said annular section and a portion of the fan.

7. An electric motor as set forth in claim 6 wherein the axial gap is generally uniform in size.

8. An electric motor as set forth in claim 6 wherein the fan is a backward curved radial fan.

9. An electric motor as set forth in claim 8 further comprising a rim on the baffle which is positioned generally at an outer periphery of the baffle, the rim having at least one tab configured for being received in a corresponding hole in the casing to releasably secure the baffle in the casing.

10. An electric motor as set forth in claim 1 wherein the casing includes at least one vent opening positioned radially outward from the fan.

11. An electric motor as set forth in claim 10 wherein said annular section of the baffle extends radially inward from the housing and forms an axial gap between said annular section and said portion of the fan.

12. An electric motor as set forth in claim 11 wherein the axial gap is generally uniform in size.

13. An electric motor as set forth in claim 11 wherein the fan is a backward curved radial fan.

14. An electric motor as set forth in claim 1 wherein the lip projects in a generally upstream longitudinal direction from an upstream face of the annular section of the baffle.

15. An electric motor as set forth in claim 14 wherein the baffle has a smooth contour with no sharp corners.

16. An electric motor having a ventilation system which inhibits generation of noise, the motor comprising:
   a housing defined by a hollow casing;
   a stator secured in the housing;
   a rotor and a rotor shaft mounting the rotor for rotation in the housing about an axis;
   a fan mounted on said rotor shalt for rotation to advance a flow of cooling air through the housing to cool the motor, the fan having a plurality of blades; and
   a baffle secured in the housing at a position between the stator and the fan, the baffle having positioned generally at an outer periphery of the baffle, the rim having at least one tab configured for being received in a corresponding hole in the casing to releasably secure the baffle in the casing.

17. An electric motor having a ventilation system, the motor comprising a housing, a stator secured in the housing, a rotor and a rotor shaft mounting the rotor for rotation in the housing about an axis, a fan mounted on the rotor shaft for rotation to advance a flow of cooling air through the housing to cool the motor, the fan having a central hub and a plurality of blades, the blades of the fan being spaced from the hub to form a clearance region between the hub and the blades, and a baffle secured in the housing at a position generally between the stator and the fan, the baffle having an annular shape, and a central opening, and at surrounding the central opening, the lip having a curved convex surfaces a curved portion of the baffle extending radially inward from the housing and positioned axially above a portion of the fan forming an axial gap between said curved portion of the baffle and said portion of the fan.

18. The electric motor of claim 17 wherein the axial gap is generally uniform in size.

19. The electric motor of claim 17 wherein the housing includes at least one vent opening positioned radially outward from the fan.

20. An electric motor having a ventilation system which inhibits generation of noise, the motor comprising a housing defined by a hollow casing, a stator secured in the housing, a rotor and a rotor shaft mounting the rotor for rotation in the housing about an axis, a fan mounted on said rotor shaft for rotation to advance a flow of cooling air through the housing to cool the motor, the fan having a plurality of blades, and a baffle secured in the housing at a position between the stator and the fan, the baffle including an annular section, a central opening and a lip surrounding the central opening, the lip having a curved convex surface, the blades of the fan having a shape corresponding to the curved convex surface of the lip.

* * * * *